July 5, 1960 H. W. SUEHLSEN 2,943,557
BARBECUE GRILL
Filed Dec. 23, 1957 3 Sheets-Sheet 1

INVENTOR.
Herman W. Suehlsen
BY
Cook and Schermerhorn
ATTYS.

July 5, 1960 H. W. SUEHLSEN 2,943,557
BARBECUE GRILL
Filed Dec. 23, 1957 3 Sheets-Sheet 2

INVENTOR.
Herman W. Suehlsen
BY
Cook and Schermerhorn
ATTYS.

July 5, 1960 H. W. SUEHLSEN 2,943,557
BARBECUE GRILL
Filed Dec. 23, 1957 3 Sheets-Sheet 3

INVENTOR.
Herman W. Suehlsen
BY
Cook and Schermerhorn
ATTYS.

United States Patent Office 2,943,557
Patented July 5, 1960

2,943,557

BARBECUE GRILL

Herman W. Suehlsen, 1212 Main St., Milwaukie, Oreg.

Filed Dec. 23, 1957, Ser. No. 704,517

14 Claims. (Cl. 99—421)

This invention relates to improvements in a barbecue grill and has particular reference to a barbecue grill of the portable outdoor type for home use on a patio or the like.

Objects of the invention are to provide a barbecue grill which is highly efficient in the transmission of radiant heat to the food and, hence, economical in its fuel consumption, to provide a grill having an extensive reflector to utilize radiant heat energy which is ordinarily lost in such devices, to provide a grill having an adjustable firebox for varying the heat intensity on the cooking surface, to provide a grill in which meat juices and fats cannot drip into the firebox, to provide a grill in which the meat juices and fats are saved for basting or other purposes, and, in general, to provide a highly efficient barbecue grill for home use which will retain the natural flavor of steaks, which is economical to construct and which is rugged and durable in use.

Still other objects are to provide a detachable rotisserie unit and to provide a disposable reflector and package fuel unit for use with a conventional type of barbecue grill.

In order to produce a superior flavor in barbecued steaks, the present grill is arranged so that meat drippings cannot fall into the firebox to produce flame and smoke which have a deleterious effect on the flavor. It is intended that the broiling be accomplished by the clean radiant heat from charcoal, coke or some form of fuel briquets which burn normally, substantially without flame or smoke. For this purpose the grill surface is made circular or polygonal in outline and of generally annular configuration having a covered, non-broiling central portion beneath which the firebox is positioned. In one form of the invention, a firebox for conventional fuel is equipped with an adjustable support for raising and lowering its position relative to the grill surface. In another form of the invention, a disposable firebox is incorporated in a packaged fuel unit.

The firebox is arranged to emit direct radiant heat from the glowing fuel to the under surface of the grill and surrounding the firebox is an inverted generally conical reflector to reflect upward toward the grill all radiant heat emitted in lateral directions from the sides of the firebox. The central covered portion of the grill preferably carries a smaller inverted conical reflector immediately above the firebox to reflect the vertical heat rays laterally and upwardly toward the under side of the grill surface as well as horizontally toward the large reflector from which they are then reflected upward toward the under side of the grill surface. The large reflector also forms a grease collector having a gutter around its bottom edge arranged to collect all juices dripping from the meat on the grill.

These and other objects will be apparent and the invention will be better understood with reference to the accompanying drawings illustrating a preferred embodiment of the invention. The invention may take other forms, however, and is not to be limited to the specific form of device illustrated. Various changes in the construction and arrangement of parts will occur to persons skilled in the art and all such modifications within the scope of the appended claims are included in the invention.

Figure 1:
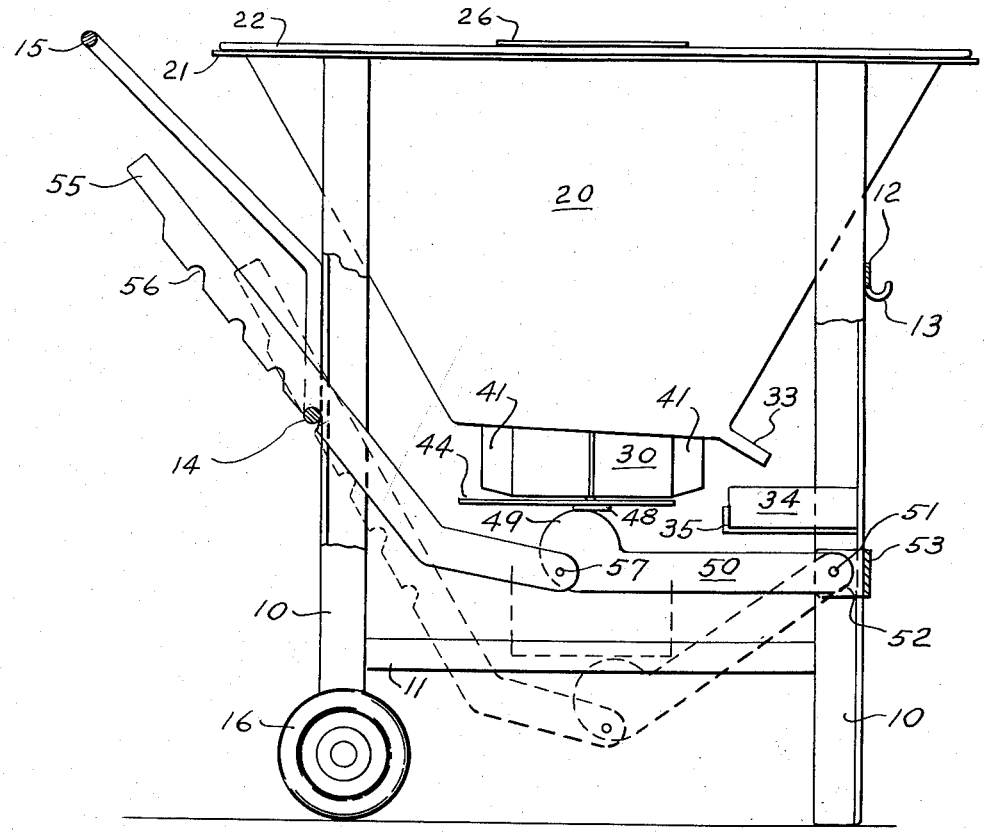
Figure 1 is a side elevation view of a barbecue grill embodying the principles of the invention.
Figure 4:
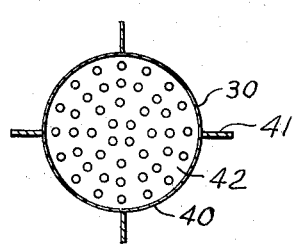
Figure 4 is a sectional view of the firebox taken on the line 4—4 of Figure 3.
Figure 5:
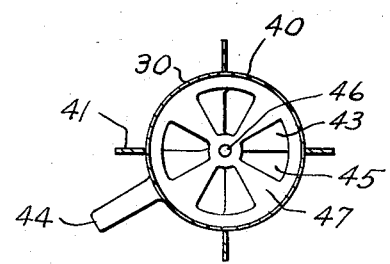
Figure 5 is a sectional view of the firebox taken on the line 5—5 of Figure 3.
Figure 3:
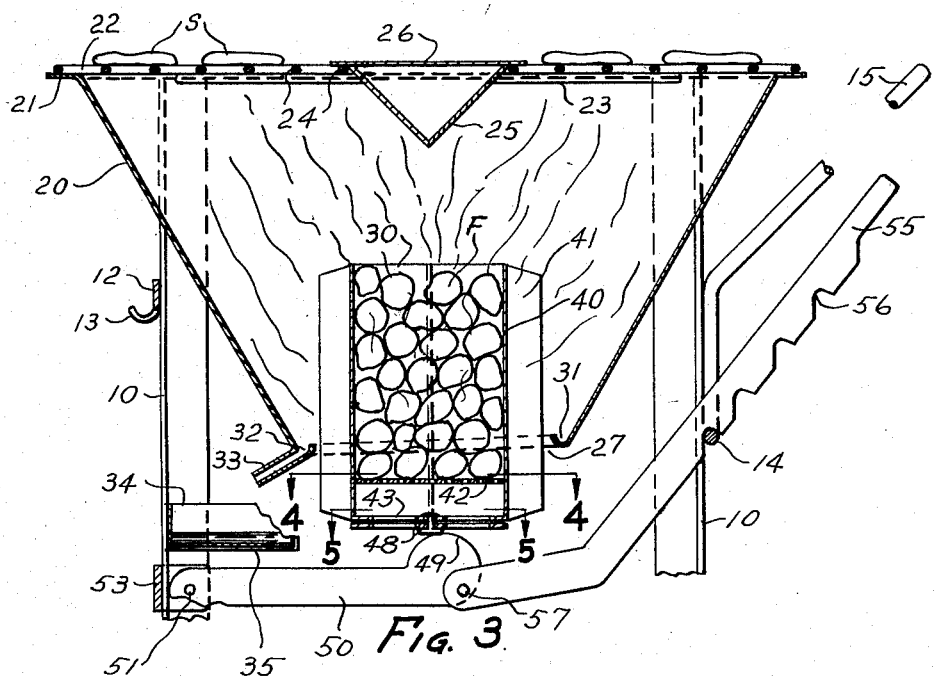
Figure 3 is a vertical sectional view taken on the line 3—3 of Figure 2.

The various parts of the device in Figures 1 and 3 are mounted on a frame comprising four vertical legs 10 which may conveniently be made of angle irons. On two sides of the rectangular frame thus formed by the legs 10, the legs are held in spaced relation by a pair of horizontal frame members 11. The two legs on the back side of the frame are held in spaced relation by a horizontal bar 12 equipped with hooks 13 for spoons, forks and other equipment. The two legs on the front side of the frame are held in spaced relation by a horizontal bar 14 having an upwardly and outwardly extending closed loop portion forming a handle 15. The frame may also include other spacing and bracing members interconnecting the legs 10. In order to make the device conveniently portable, the front legs are equipped with wheels 16.

Resting on the upper ends of the four legs 10 is an inverted, truncated, generally conical reflector 20 having an outturned horizontal rim flange 21 overlying the top ends of the legs and supported thereby. If desired, instead of being conical, reflector 20 may have four or more flat sides forming an inverted truncated pyramid. Flange 21 may be attached to the legs 10, or it may merely rest loosely thereon for convenient removal of the reflector for cleaning.

Figure 2:
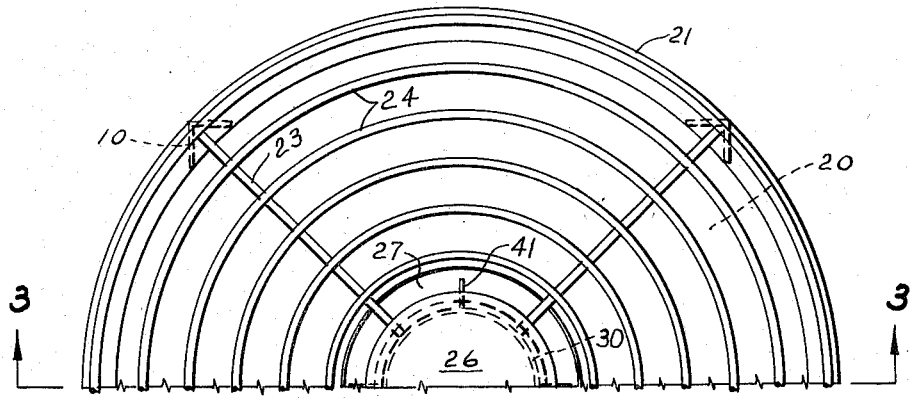
Figure 2 is a fragmentary top plan view of the device shown in Figure 1.

Resting, preferably loosely, on the peripheral flange 21 is an open grill 22 comprising a plurality of radial bars 23 welded to the under sides of a plurality of concentric circular bars 24, as shown in Figure 2. Bars 24 support the steaks S or other articles to be broiled. The central bar or ring 24 supports an inverted conical reflector 25 having a flat circular top plate 26.

The reflector 20 has a bottom opening 27 for a vertically adjustable firebox 30. The lower edge of reflector 20, which defines the opening 27, is inturned to provide a peripheral grease gutter 31 which collects all drippings that may fall on any part of the reflector. Gutter 31 is inclined and drains to a low point 32 equipped with a spout 33 which discharges into a suitable grease receptacle 34 resting on a shelf or bracket 35 on the frame.

Firebox 30 comprises a metal container having a vertical cylindrical side wall 40 equipped with a plurality of outstanding vertical fins 41. Fins 41 form guides loosely engaging the inner edge of circular gutter 31 to hold the firebox centered in the opening 27 in different height adjustments. Fins 41 maintain sufficient spacing between the cylindrical wall 40 of the firebox and grease trough 31 to prevent overheating of the grease trough and scorching of the grease flowing therein whereby the grease and drippings collected in receptacle 34 are usable in cooking. Fins 41 also constitute heat radiators for augmenting the lateral radiation from the firebox toward reflector 20.

The fuel F in the firebox is supported on a perforated grate plate 42 and the bottom of the firebox is equipped with an adjustable draft plate 43 which may be rotated by a handle 44 to open or close bottom draft openings 45. Draft plate 43 is pivotally mounted on a central pin or rivet 46 in a bottom plate 47 containing the draft openings 45. Bottom plate 47 is welded or otherwise integrally connected with the side wall 40 of the firebox. Pin 46 also secures a central bearing plate 48 for supporting the firebox.

If desired, the side wall of firebox 30 may be perforated or made of suitable wire mesh to cause the charcoal to burn faster and radiate laterally more effectively when high heat is desired.

Plate 48, which may assume the shape of a circular button or washer, rests on an arcuate edge surface 49 of a support arm 50. The other end of arm 50 is pivotally mounted on a pin 51 in a bracket 52 on a horizontal frame bar 53 spanning the two rear legs 10 some distance below the bar 12. An adjusting handle 55 having a series of notches 56 to engage the bar 14 is pivotally connected with arm 50 by a pin 57. Thus, by manipulation of handle 55, the firebox 30 may be raised or lowered through a considerable range of movement, as shown in broken lines in Figure 1. By adjusting draft plate 43 and the height of the firebox, the desired intensity of radiant heat may be obtained on the cooking surface.

The present arrangement utilizes substantially all the heat furnished by the fuel 30 in the broiling of the meat and minimizes the loss of heat. A large portion of the heat from the fuel 30 is transmitted to the under surface of food on grill 22 by direct radiation from the exposed top surface of the fuel in the firebox. Cylindrical wall 40 also becomes very hot in its upper portion whereby it radiates heat horizontally to reflector 20. Reflector 20 preferably assumes a vertical angle of approximately 45° with respect to the vertical radiating surface 40 whereby the horizontal rays from surface 40 are reflected straight up throughout the annular area of the cooking surface represented by rods 23 and 24.

Another portion of the heat is radiated straight up from the top surface of the fuel against reflector 25 which is disposed at approximately a 45° vertical angle with respect to a horizontal plane. Some of these rays from reflector 25 are reflected at an angle slightly above the horizontal and impinge directly on the steaks S. Other rays from reflector 25 are approximately horizontal whereby they strike reflector 20 and are then reflected upward. Thus, all the heat is utilized and a relatively small central firebox will provide sufficient heat to broil steaks distributed over the whole annular surface of the grill represented by rods 23 and 24. The useful grilling surface is thereby many times the area of fuel exposed in the firebox.

Center plate 26 may be used as a warming plate for keeping a coffee pot or food warm. It is not intended that this plate be used for cooking. Reflector 25 forms a receptacle which may be filled with suitable heat storage material, if desired, in order to keep food warm on plate 26 after the firebox 30 has cooled off.

The reflectors 20 and 25 are preferably formed from some metal, such as stainless steel, which will maintain their reflective properties when exposed to the weather and to meat drippings and the like. Such a surface is easy to clean so that full advantage may be taken of its reflective characteristics. When the device is not to be used for a period of time, the reflector 20 may be lifted off the frame and disposed in inverted position to protect the inner reflecting surface. The firebox is not attached to any part and so it also may be lifted out of the frame when desired.

The diameter of grill plate 26 exceeds the diameter of cylindrical shell 40 of the firebox 30 and is approximately equal to the diameter of the circular opening 27 at the lower end of large reflector 20, whereby drippings from the steaks S cannot fall into the firebox to cause flame or smoke which would impair the flavor of the steaks. All the drippings fall on the sloping surface of reflector 20 and are guided by circular trough 31 and spout 33 to the receptacle 34. The proximity of the firebox to the lower end of reflector 20 and grease trough 31 keeps these parts warm so that grease will not congeal thereon and interfere with the drainage of all drippings through spout 33.

The term "generally conical" is used in the appended claims with reference to the reflectors 20 and 25 to include pyramidal, as well as conical, shapes, the one being generally the equivalent of the other for applicant's purpose. The term "open grill" is used to define a food supporting member having extensive openings for the passage of radiant heat therethrough, such as the grill surface formed by bars 23 and 24, and through which drippings may freely fall, in order to distinguish from an imperforate hot plate or stove top, such as used for frying by conduction of heat from the plate to the food.

Figures 6, 7:
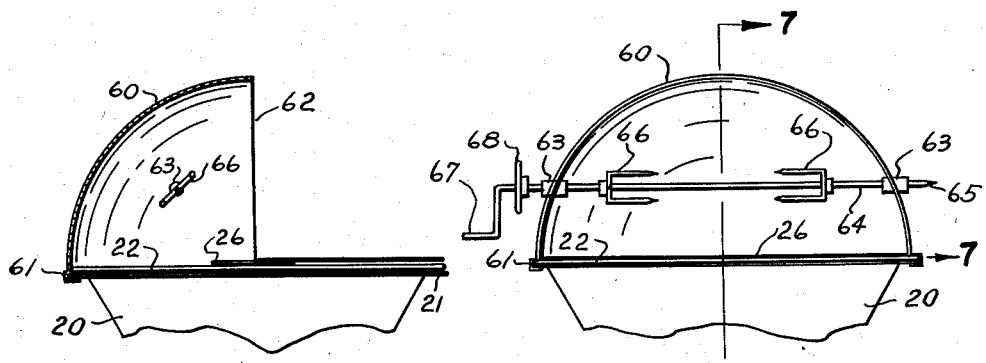
Figure 6 is a fragmentary elevational view of a rotisserie attachment.
Figure 7 is a view of the rotisserie at right angles to Figure 6.

Figures 6 and 7 illustrate a rotisserie attachment which may be used with the device in Figure 1 when it is desired to cook meat on a rotating spit. The rotisserie attachment comprises a spherically curved hood 60 with a semi-circular lower edge equipped with a channel 61 to receive the rim flange 21 of reflector 20. For use with the rotisserie, the grill 22 is made slightly smaller in diameter than the outside diameter of rim 21, so that the grill will fit within the hood 60 as shown in Figure 7. Hood 60 extends through a quadrant sector of a sphere so as to present an open side 62 in a vertical diametral plane on the axis of the conical reflector 20.

Hood 60 is equipped with suitable bearings 63 for a removable square shaft 64 having a pointed end 65. Pointed skewers 66 are adjustably mounted on shaft 64 to support one or more pieces of meat within the hood 60 and directly over the grill 22 at one side of center plate 26 so as to receive radiant heat directed upwardly from reflector 20. Shaft 64 is equipped on one end with a hand crank 67 for turning the spit, and may also be equipped with a sprocket 68 for connection with a motor drive, not shown.

The rotisserie unit just described is readily removable by disengaging channel 61 from rim 21.

Figure 8:
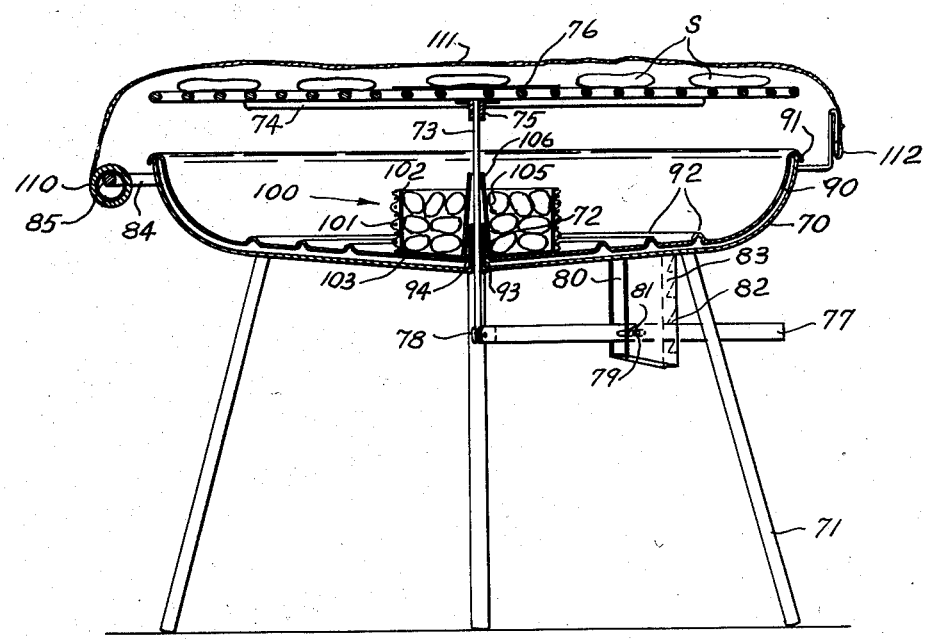
Figure 8 is a sectional view showing a disposable reflector and package fuel unit in a conventional barbecue grill.

Figure 8 shows a conventional type of barbecue grill having a broad and shallow circular fire pan 70 mounted on tripod legs 71. An upstanding tubular sleeve 72 in the center of the bottom of pan 70 guides a vertical rod 73 which supports a grill frame 74. The center of grill frame 74 is equipped with a socket 75 loosely receiving the upper end of rod 73 so that the grill may be removed by merely lifting it off the rod 73. For the purpose of the present invention, the central portion of the grill is covered by a plate 76.

Grill 74 is raised and lowered and supported in adjusted vertical position by means of a hand lever 77 pivotally connected at 78 with the lower end of rod 73. Handle 77 is supported at its mid point by a pin 79 in a bracket leg 80 depending from the under side of fire pan 70. Pin 79 passes through a slot 81 in the handle 77. The handle is secured in adjusted pivotal position by engaging its upper edge under a selected one of a series of tooth-like projections 82 struck out from a second depending bracket leg 83.

In order to carry the device, the fire pan 70 is equipped with one or more laterally projecting handles 84 comprising a U-shaped metal rod having a straight horizontal bar portion 85 of some length.

It is customary in such a device to build a charcoal fire directly in the bottom of fire pan 70 and to spread the fire around to some extent in order to heat the whole surface of grill 74. The present invention provides means for conserving fuel and producing an improved grilling of meat and the like by clean radiant heat with a small centrally located fuel package. In the practice of the present invention, the fire pan 70 is lined with a thin, light weight, disposable metal reflector 90 of heavy aluminum foil, or the like, which is just thick enough to retain its desired pre-formed shape corresponding to the inner contour of fire pan 70. Reflector 90 thus comprises a shallow pan of the same general shape as fire pan 70 and slightly smaller in order to fit loosely therewithin, as shown. Reflector 90 preferably has an outturned and downturned rim flange 91 to overhang the upper edge of fire pan 70 for convenience in removal and to keep drippings out of the pan 70. Also, the bottom portion of reflector 90 is equipped with a plurality of concentric circular ridges 92 which form grease gutters to prevent drippings from the grill from running to the center of the reflector. The center of reflector 90 is apertured at 93, and the margins of this aperture are preferably upturned, as indicated at 94, to pass over rod 73 and sleeve 72 when the grill 74 is removed.

The package fuel unit is designated generally by the numeral 100. This fuel unit comprises a wire basket in the form of a cylindrical wire screen 101 without a bottom. Within this screen is a circular carton 102 of heavily waxed cardboard having a cylindrical side wall frictionally engaged with screen 101 and having a bottom wall 103 to retain a quantity of charcoal briquets 105, or other suitable fuel. If desired, this carton may also include a top or cover of the same material so that the charcoal is entirely enclosed and sealed within the carton for cleanliness in handling. Carton 102 also includes a circular central wall 106 defining a vertical circular opening to receive the rod 73 and sleeve 72.

The fire is started by merely lighting different portions of the waxed cardboard carton with a match, whereby the carton serves as an igniter for the charcoal therewithin. After the carton has burned away, the glowing charcoal will radiate heat upwardly and also laterally through the basket 101 toward the clean and unused reflector 90. Heat radiation impinging on the reflector 90 is reflected upward against the under sides of steaks S, or the like, on the grill 74. The near sides of ridges 92 assist in the upward reflection of the laterally radiated heat. Center plate 76, which is slighter larger than basket 101, prevents drippings from falling into the fire, and ridges 92 prevent drippings from flowing into the fire, whereby the food is cooked by clean, direct and reflected radiant heat without smoke or flame. After the igniter carton has burned away, the charcoal 105 will not develop flame or smoke as long as drippings are kept out of the fire.

A high cooking temperature may be attained with a relatively small fuel package if the food on the grill is covered by reflective metal foil, as shown. For this purpose, a roll 110 of aluminum foil is supported on the handle bar 85 and a length of sheet 111 unrolled therefrom and drawn over the top of the grill with the end portion secured by a spring clip 112 mounted on the opposite side of pan 70. Upward radiation loss is thereby substantially eliminated and an oven effect is obtained which imparts a roasted flavor to the food. The roll support 85 and clip 112 are preferably spaced outwardly from pan 70 sufficiently to allow for the admission of air to the fire. Also, when the grill is elevated above the pan 70, as shown, the side edges of the foil sheet 111 will be raised sufficiently to admit air under the sides of the sheet.

After the food is cooked, the wire basket 101 and reflector 90 may be discarded, leaving the fire pan 70 clean. Also, the used portion of cover sheet 111 may be torn off and discarded. On the next occasion of use, a new fuel package and reflector 90 are employed and, after the broiling operation is started, a fresh length of cover foil is drawn from the roll 110. Thus, the reflective surfaces are always clean and bright at the beginning of each cooking operation without the necessity of scouring and washing the metal.

Having now described my invention and in what manner the same may be used, what I claim as new and desire to protect by Letters Patent is:

1. A barbecue apparatus comprising a horizontal open grill for supporting food to be broiled, an open top firebox under the center of the grill for combustible fuel, said firebox being considerably smaller in plan area than said grill, a reflector laterally surrounding said firebox and extending outwardly and upwardly substantially from said firebox to the periphery of said grill at an angle to reflect heat radiated laterally from said firebox upward to said grill, said grill having an annular broiling surface disposed vertically above said reflector, and an upturned bottom edge on said reflector forming a peripheral grease trough surrounding said firebox at a distance therefrom arranged to collect drippings from said broiling surface.

2. A barbecue apparatus as defined in claim 1, including an imperforate center plate in said grill above and coextensive with the plan area of said fire box to prevent cooking juices from material on said grill from dropping into said firebox.

3. A barbecue apparatus as defined in claim 1, including an inverted, generally conical, reflector depending from the under side of said grill directly above said firebox to reflect upwardly radiated heat from the firebox radially outwardly toward said first reflector.

4. A barbecue apparatus comprising an inverted, truncated, generally conical, reflector having an opening in its truncated end, a firebox support beneath said opening, an open top firebox mounted in said opening on said support, means for raising and lowering said firebox support, an open grill covering the large end of said reflector above said firebox, said reflector being inclined at such angle as to reflect heat radiated laterally from said firebox upwardly against said grill, and a shield plate in the center of said grill to prevent juices from material on said grill from dropping into said firebox.

5. A barbecue apparatus as defined in claim 4, including an upturned lower edge on said reflector forming a peripheral grease gutter at said opening, and a receptacle arranged to collect grease therefrom.

6. A barbecue apparatus as defined in claim 5, including outstanding vertical fins on said firebox to guide said firebox for vertical movement in said opening and hold said firebox spaced from said grease gutter.

7. A barbecue apparatus comprising a supporting frame, a truncated, generally conical, reflector mounted in said frame with its large end in a horizontal plane above its small end, an open grill extending across said large end of the reflector, a firebox beneath said grill mounted for vertical movement through an opening in the small end of said reflector, means to center said firebox in said opening spaced from said reflector, said reflector being inclined at such angle as to reflect heat radiated laterally from said firebox upwardly against said grill, an adjustable height support for said firebox in said frame, a peripheral grease gutter around said opening at said small end of said reflector, and a shield plate in the center of said grill to prevent juices from material on said grill from dropping into said firebox.

8. A barbecue apparatus comprising a frame having a plurality of legs, an inverted, truncated, generally conical, reflector having an outstanding rim on its large end supported on said legs, an open grill supported on said rim, said reflector having a bottom opening in its small end surrounded by a grease gutter, a firebox mounted for vertical movement in said opening, said reflector being inclined at such angle as to reflect heat radiated laterally from said firebox upwardly against said grill, an inverted, generally conical, reflector on the under side of said grill above said firebox, an arm pivotally mounted on said frame supporting said firebox, a handle connected with said arm for raising and lowering said firebox, and means engageable with said handle for holding said firebox in adjusted vertical position.

9. A barbecue apparatus comprising a horizontal open grill for supporting food to be broiled, a firebox under the center of said grill, a plate in the center of said grill above and coextensive with the plan area of said firebox to prevent juices from material on said grill from dropping into said firebox, a reflector extending outwardly and upwardly from said firebox substantially to the periphery of said grill at an angle to reflect heat radiated laterally from said firebox upwardly against said grill said grill having an annular broiling surface extending around said center plate, all parts of said broiling surface being disposed vertically above said reflector, and an annular grease gutter on said reflector extending around said firebox at a distance therefrom arranged to collect all drippings from said grill.

10. A barbecue apparatus as defined in claim 9 including a rotisserie device, said rotisserie device comprising a hood, means on the lower edge of said hood for attachment to the periphery of said reflector, bearings in said hood for supporting a spit over said reflector at one side of said firebox, and a spit mounted for rotation in said bearings.

11. A barbecue apparatus as defined in claim 9, said firebox comprising a disposable wire basket containing charcoal in a waxed cardboard carton, and said reflector comprising a disposable metal foil.

12. A barbecue apparatus as defined in claim 9 including a holder for a roll of metal foil on one side of said reflector and a spring clip on the opposite side of said reflector for securing a length of foil disposed across the top of said grill.

13. A barbecue apparatus comprising a supporting frame, a truncated conical reflector supported in said frame with its large end uppermost, the small end of said reflector defining a bottom opening, a peripheral grease gutter around said bottom opening, an annular open grill extending across the large end of the reflector, the center of said grill being closed by a plate vertically above and approximately coextensive with said bottom opening so that all drippings from material being cooked on said annular grill will fall on said reflector, a firebox projecting upwardly through said bottom opening, said reflector being inclined at such angle as to reflect heat radiated laterally from said firebox upwardly against said grill, means for raising and lowering said firebox in said bottom opening during a cooking operation, and means for holding said firebox centered in said bottom opening in spaced relation to said grease gutter.

14. A barbecue apparatus comprising a frame having a plurality of legs, an inverted, truncated, conical reflector having an outstanding rim on its large end supported on the top ends of said legs, an open grill supported on said rim, said reflector having an upturned bottom edge in its small end forming a peripheral grease gutter around a bottom opening in the reflector, a firebox projecting upwardly through said opening, said reflector being inclined at such angle as to reflect heat radiated laterally from said firebox upwardly against said grill, a center plate on said grill above said firebox defining the inner boundary of an annular grilling surface disposed above said reflector so that all drippings from material being cooked on said annular grilling surface will fall on said reflector, an arm pivotally mounted on said frame supporting the bottom of said firebox beneath said bottom opening in the reflector, a handle connected with said arm and disposed beneath said reflector for raising and lowering the firebox in the reflector, and outstanding vertical fins on said firebox to guide said firebox for vertical movement in said opening and hold said firebox spaced from said grease gutter.

References Cited in the file of this patent

UNITED STATES PATENTS

| | | |
|---|---|---|
| 1,276,791 | Mayer | Aug. 27, 1918 |
| 1,401,803 | Lynes | Dec. 27, 1921 |
| 2,349,617 | Gorman | May 23, 1944 |
| 2,487,605 | Smith | Nov. 8, 1949 |
| 2,517,360 | Singer | Aug. 1, 1950 |
| 2,531,684 | Jackson | Nov. 8, 1950 |
| 2,834,661 | Chaplin | May 13, 1958 |

OTHER REFERENCES

Washington Daily News, April 23, 1957, pg. 9.